United States Patent [19]

Albaugh

[11] Patent Number: 4,544,135
[45] Date of Patent: Oct. 1, 1985

[54] RIG SKIDDING SYSTEM

[75] Inventor: E. Kurt Albaugh, Houston, Tex.

[73] Assignee: Dolphin Titan International, Inc., Houston, Tex.

[21] Appl. No.: 672,124

[22] Filed: Nov. 16, 1984

Related U.S. Application Data

[63] Continuation-in-part of Ser. No. 373,166, Apr. 29, 1982, abandoned.

[51] Int. Cl.⁴ .............................................. B65G 7/00
[52] U.S. Cl. ................................................... 254/108
[58] Field of Search .................. 254/95, 105, 108–111; 269/208, 209, 251, 285

[56] References Cited

U.S. PATENT DOCUMENTS

| 292,207 | 1/1884 | Corbett | 269/208 |
|---|---|---|---|
| 302,346 | 7/1884 | McAuley | 269/204 |
| 1,850,178 | 3/1932 | McChesney | 269/208 |
| 2,707,835 | 5/1955 | Gierlich | 269/208 |
| 2,764,195 | 9/1956 | Helmes | 269/251 |
| 2,868,091 | 1/1959 | Du Bois | 269/251 |
| 3,031,167 | 4/1962 | Roussel | 254/105 |
| 3,439,821 | 4/1969 | Hand | 254/110 |
| 3,459,134 | 8/1969 | Shepheard | 254/95 |
| 3,881,687 | 5/1975 | Johansson | 254/108 |

FOREIGN PATENT DOCUMENTS

| 181052 | 2/1955 | Austria | 254/110 |
|---|---|---|---|
| 783212 | 11/1980 | U.S.S.R. | 254/108 |

OTHER PUBLICATIONS

Hydranautics Catalogue, Hydraunautics, Goleta, Calif.
Kenmark Catalogue, Kenmark Industries, Santa Barbara, Calif.

Primary Examiner—Robert C. Watson
Attorney, Agent, or Firm—Guy E. Matthews

[57] ABSTRACT

An improved skidding system of the hydraulic cylinder type is provided having thick cover plates with precut holes therethrough fixed to the tops of skid beams and including claws attached to the ends of the hydraulic cylinders having slidably mounted cylinder pins therein for engagement with the holes through the cover plates to anchor the ends of the hydraulic cylinders as the structure attached to the cylinders is skidded across the cover plates.

1 Claim, 5 Drawing Figures

RIG SKIDDING SYSTEM

This application is a continuation-in-part of application Ser. No. 373,166, filed April 29, 1982, now abandoned.

BACKGROUND OF THE INVENTION

The present invention relates to an apparatus for skidding structures along a surface, and more particularly to an apparatus for skidding a heavy skid base and substructure for a drilling rig on an offshore platform to position the drilling equipment over a particular well.

It is common in drilling wells offshore that numerous wells will be drilled from the same platform. A system is required to move the drilling rig to the next well in a series of wells to be drilled or worked. In the past, this has been accomplished by skidding a skid base, to which the drilling rig is attached, along the top of the drilling platform.

The two I-beams comprising the top chord of the deck truss of the platform typically serve as the skidding surface for a skid base which spans across the beams. This beam is sometimes referred to as the skid beam or capping beam. The skid base is pushed or pulled longitudinally across the platform by two skidding assemblies. For lateral movement of the rig, a substructure carrying the drilling equipment sits on and skids on the top flanges of the skid base. Generally, two skidding assmeblies push or pull this substructure across the top of the skid base.

In the prior art, there are two basic types of rig skidding assemblies. The first is the rack and pinion type. The second is the rod and piston type.

The present invention falls in the second class of rig skidding systems. This type of system employs, for example, a hydraulic cylinder having one end connected to the skid base and the opposite end connected to a device for engaging the capping beams of the platform. By extending or retracting the cylinder rod, the skid base is moved.

It is known in the prior art to provide a hydraulic gripper to anchor the end of the hydraulic cylinder to the capping beam. In this system, parallel plates are disposed above and below the top flange of the capping beam on both sides of the web. The plates are hydraulically squeezed together to grip the top flange of the beam so the hydraulic cylinder may be activated to move the skid base with respect to the platform.

In another prior system, the hydraulic cylinder is anchored to the capping beam by a claw. The claw includes a plate which slides on the beam. The capping beam has a plurality of rows of equally spaced rectangular openings, called jacking holes, through the top flange of the beam on both sides of the web. The bottom of the claw typcially has four L-shaped fingers attached which fit through four rectangular openings in the beam and under the flange to anchor the end of the cylinder.

In yet another prior art system, the end of the hydraulic cylinder is pinned to a claw or shoe which rides on the capping beam. The shoe has guides attached extending downwardly on either side of the top flange of the beam and inwardly to prevent lifting of the shoe from the beam. A sleeve attached to the shoe contains a circular pin which moves down through the shoe to engage the round holes in the capping beam. The pin is mounted on the lateral center line of the shoe and accordingly a row of spaced apart holes must be cut through the top flange above and generally into the web along the centerline of the capping beam.

A major problem with the last two systems is the cutting of openings through the capping beams. These beams are usually major structural members of the platform and cutting holes through them reduces their structural strength. It is obviously preferable that no holes be cut through such structural members, although some platform designers may make allowance for the loss of steel caused thereby. In the case of the system last described, the holes extend down into the web of the I-beam; a very undesirable situation.

In older platforms the jacking holes may already be cut through the capping beam. If this is the case, the drilling contractor must either modify his claw to fit the holes or the oil company must modify the holes or the hole pattern to fit the contractor's claw.

Other prior art of which Applicant is aware is that prior art cited in application Ser. No. 313,166, now abandoned.

SUMMARY OF THE INVENTION

It is an object of the invention to provide an improved rig skidding system which is less complex and less expensive than a hydraulic gripping system, the use of which does not weaken the structural strength of the drilling platform.

The present invention is a skidding system of the rod and piston type which may be employed on new or old platforms. The system comprises cover plates attached to the tops of the platform capping beams. Holes are formed through the cover plates to avoid damage to the beams. Round pin claws are provided having reversible pins and width adjustment features. The pins engage directly with the holes in the cover plates with the result that the capping beams retain their structural strength and are in fact strengthened.

BRIEF DESCRIPTION OF THE DRAWINGS

For a further understanding of the invention, reference should be had to the following detailed description, taken in conjunction with the accompanying drawings, in which like parts are given like reference numbers and wherein.

DETAILED DESCRIPTION OF THE PREFERRED EMBODIMENT

Figure 1:
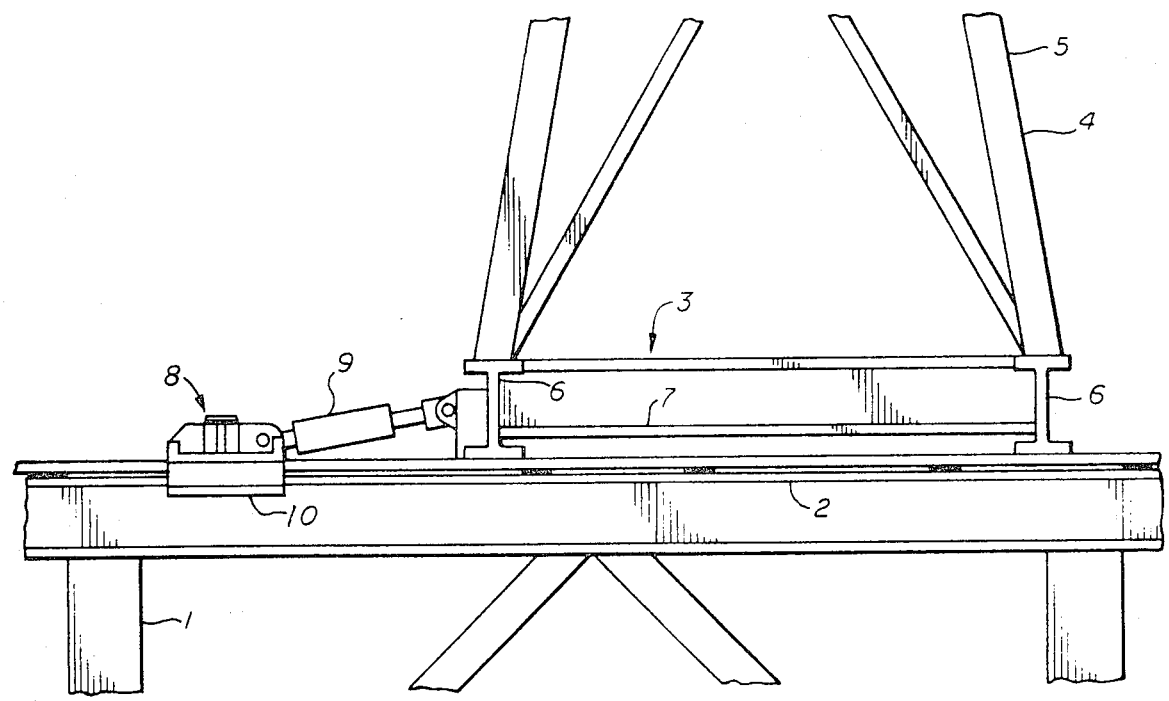
FIG. 1 is a side view of a typical drilling platform with a skid case showing the skidding assembly.
Figure 2:
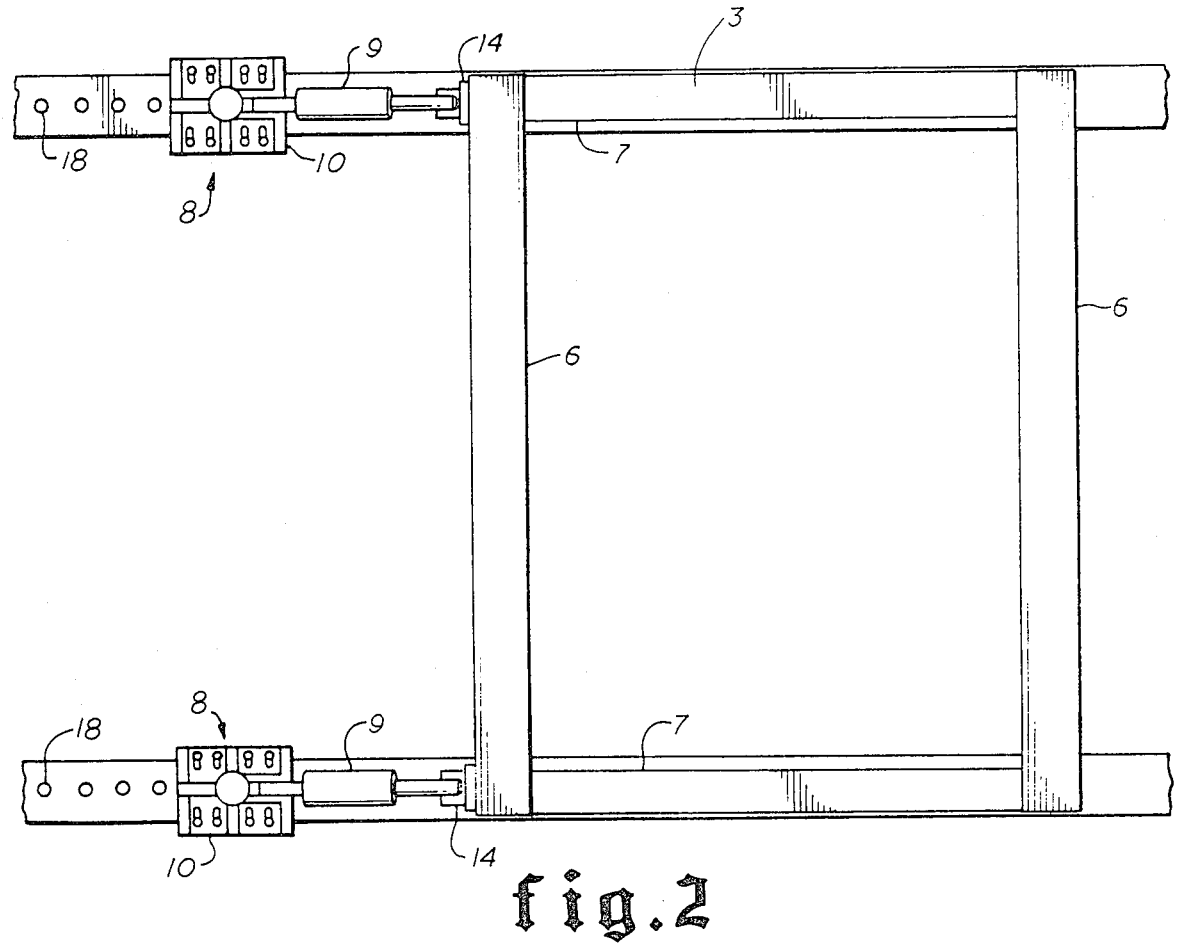
FIG. 2. is a top view of the drilling platform and skid base of FIG. 1.

In FIGS. 1 and 2, a typical drilling platform 1 is depicted. The capping beams 2 extend the full length of the top of the platform and form the top member of the deck truss.

A skid base 3 spans the two capping beams 2 and supports the substructure 4 and the drilling rig and equipment (shown in phantom lines 5). The skid base 3 has two long I-beams 7 which span the gap between the capping beams 2. Two cross beams 7 are attached to the web of the skid base beams 7 to complete the rectangular skid base assembly.

The construction of the subassembly 4 may be any such as is generally known in the art. To provide for lateral movement of the drilling rig 5 with respect to the platform, the subassembly 4 is skidded over the skid base beams 6 in the same manner in which the skid base is skidded across the capping beams, as is set forth in more detail below.

The skidding system of the invention is indicated generally at 8 in FIGS. 1 and 2. Hydraulic cylinders 9 have one end pinned to the skid base 3. The other ends of the cylinders are pinned to claws 10 which are anchored to the platform in the manner of the invention. In use, one skidding assemlby is disposed between each of the capping beams 2 and the skid base. When the hydraulic cylinders are extended, the skid base is moved longitudinally over the capping beams until the drilling equipment is located in the correct longitudinal position for drilling or working the next well. The rig is laterally located over the well by skidding the subassembly 4 over the skid base in the same manner.

The various hydraulic lines, reservoirs, and controls to operate the hydraulic cylinders 9 are not illustrated, as their selection, assembly, and usage is well known in the art, a matter of mechanical choice and not a part of the present invention.

The hydraulic cylinders 9 have extendable rods 12. The rod ends 13 are rotatably pinned to brackets 14 by means of a pins 15. The brackets 14 are attached to the skid base assemlby in line with the plane of the web of the capping beam. The brackets 14 may be attached to the skid base by any suitable means, such as welding, however, this is not critical to the invention. It is preferable that brackets 14 be attached on both sides of the skid base 3 as shown in FIG. 2 so the skidding system may be used on either side of the skid assembly, and therefore four brackets 14 are employed in the preferred embodiment of the invention, although only two would generally be in use at one particular time.

Figure 5:
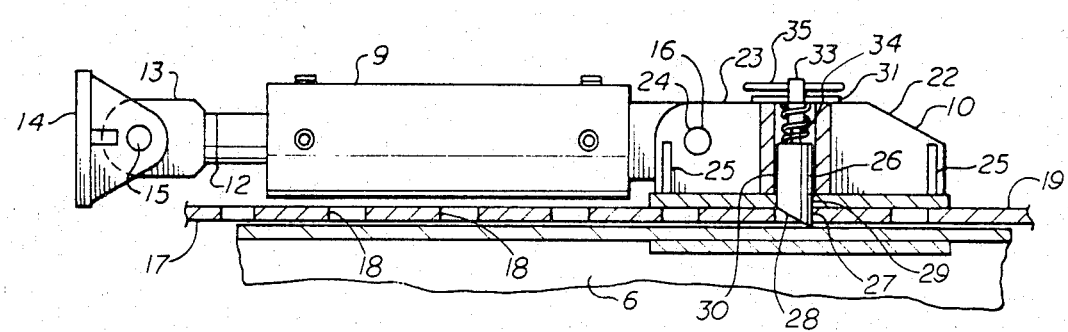
FIG. 5 is a cross-sectional view of the claw of the invention from along lines A—A of FIG. 3.

At its opposite end, hydraulic cylinders 9 are rotatably pinned to the claw assemblies 10 with pins 16 (FIG. 5). The claws ride upon cover plates 17 which is the most important part of the present invention. The cover plates 17 are elongate plates which extend the length of the top surface of the capping beams 2. A row of holes 18 are cut through the cover plates 17 before they are attached to the top flanges of the capping beam 2. The width of the cover plates is preferably ¾" to 1" less than the width of the top flange of the capping beams. This permits a ⅜" to ½" space between the edges of the cover plates and the edges of top flanges so that a continuous fillet weld can be used to fix the cover plates to the beams.

The claws 10 ride on the top surface of the cover plates 17 and each comprises a base plate 19 and a sleeve 20. The base plates 19 have generally centrally located holes 21 therethrough. The sleeves 20 are fixed to the base plates 19 so that the openings through the sleeves and the base plates are coextensive. A plurality of brace plates 22 are provided fixed, such as by welding, to the base plates 19 and the sleeves 20 to strengthen the assembly. Two spaced apart hinge brackets 23 are affixed to each claw includes holes 24 therethrough for receiving the pins 16 for attaching the hydraulic cylinders 9 to the claws 20. In addition, a plurality of stiffening brackets 25 may be provided attached to the base plates 19 and the other plates 22, 23 of the claws 10 to further strengthen the assembly.

Elongate cylindrical pins 26 are slidably carried in the sleeves 20. The ends 27 of the pins are preferably bevelled, as indicated at 28. In addition, the sections of the pins extending through the base plates 19, as well as the ends 27 of the pins, is preferably of smaller diameter than the body 30 of the pins 26. The openings 21 through the base plates 19 may then be sized to accept only the reduced diameter sections 29 of the pins. In this manner, the distance the ends 27 of the pins 26 extend below the base plates 19 is limited, which is important in moving the claws 20, as is set forth in more detail below.

Seal plates 31 are provided attached to the sleeves 20 by a plurality of bolts 32. Seal plates 31 have central holes through which pass elongate rods 33 which are fixed to the pins 26. The holes through the seal plates 31 are preferably rectangular as are the rods 33 extending through the holes. As is best shown in FIG. 5, the rods 33 include upset portions 34 adjacent the top of the pins 26. The upset portions 34 are sized so that when the rods 33 are lifted, for example by handles 35 disposed through rods, until the upset portions 34 of the rods are disposed through the seal plates 31, the rods may be rotated 180° and the rods and pins lowered so the bevelled surfaces 28 of the pins 26 are thereby reversed. Springs 36 may be provided between the bottom surfaces of the seal plates 31 and the tops of the pins to urge the pins downwardly.

Figure 4:
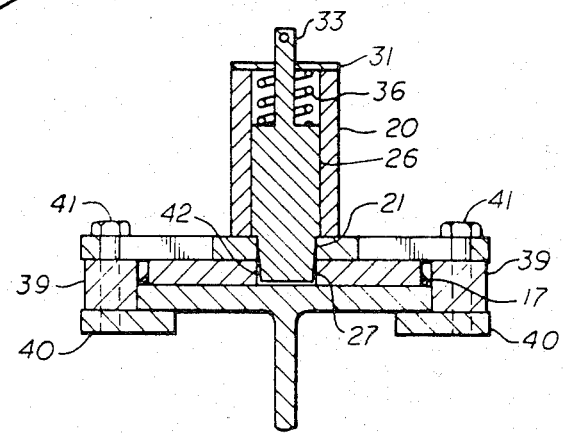
FIG. 4 is a partial sectional side view of the skidding assembly of the invention.

Guide bars 39 and guide plates 40 are provided on either side of the base plates 19, and are attached hereto by any suitable means, for example bolts 41. If desired, laterally slotted holes may be provided through the plates 19 to receive the bolts 41, which will permit the claw to be adjusted to fit on various width I-beams. As is best seen in FIG. 4, the guide plates 40 extend inwardly of the top flanges of the capping beams and prevent uplifting of the claws during the skidding operation. In addition, the guide bars 39 maintain the alignment of the claw assemblies with the capping beams.

The thickness of the cover plates is clearly a matter of design choice, however, 2" plates have been found suitable for use with a 125 ton skidding system utilizing a 5" nominal diameter pin 26. 7" nominal diamter pins for increased bearing area and pin strength, are sufficient for a 200 ton skidding system. The use of the cover plates 17 solve all of the problems inherent in the prior art. Because no holes are cut through the top flanges of the capping beams, there is not loss in structural strength. In fact, the structure is strengthened. The particularly undesirable consequence of cutting through the flange of the beam into the web is also eliminated. In addition, on older platforms it is unnecessary to modify either the holes in the capping beams or the skidding system; two cover plates 17 are welded to the capping beams of the old structure for use with the system of the invention and the structure is in fact strengthened.

Figure 3:
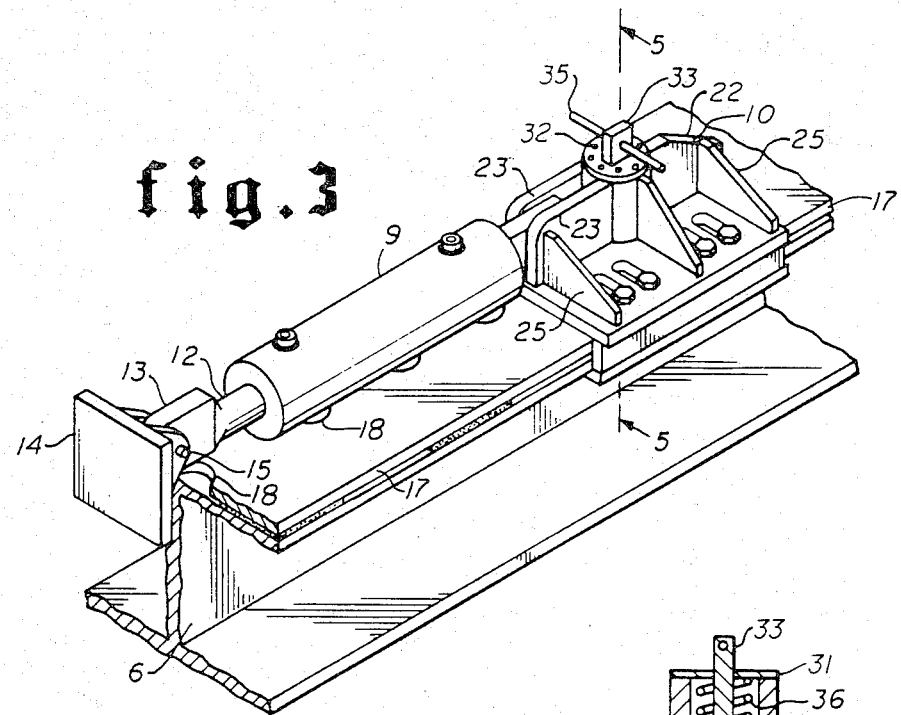
FIG. 3 is a isometric view of a second of a capping beam in conjunction with the skidding system of the present invention.

The operation of the system of the invention is quite simple. With the apparatus in the configurations illustrated in FIGS. 3 and 4, the rods 12 of the hydraulic cylinders 9 are extended. The edges 42 of the lower ends 27 of the pins will bear against the sides of the holes 18 in the cover plages, fixing the claws with respect to the platform, and the skid base will be moved as the rods extend. When the rods have been extended, and the skid base moved, as much as desired, the rods are retracted back into the hydraulic cylinders 9 which will tend to pull the claws 10 toward the skid base 3. At this point, the sloped surfaces 28 of the pins are disposed against the edges of holes 18 of the cover plates 17. The force on the claws 10 will cause the pins 26 to retract upwardly into the sleeves 20 and the claws will be pulled toward the skid base. It is preferable that the circular holes 18 through the cover plates 17 are spaced a distance apart equal to the maximum cylinder stroke less 3 or 4 inches. Twenty-four inches apart is a suitable spacing for most applications.

As shown above, skidding the skid base 3 is a simple procedure involving merely extending and retracting the hydraulic cylinders. To reverse the direction of skidding of the skid base, the handles 35 and the rods 33 are lifted upwardly until the upset portions 34 of the rods are in the holes through the cover plates 31. The rods and the pins are then rotated 180° and lowered to their original positions. In this position, the surfaces 42 of the pins are reversed and, for example, if the skid base was first moved by extending the hydraulic cylinders, it is now moved by retracting. The claws described above are thus an improvement over the prior art, particularly the prong claws, which required the cylinder to be unpinned and the claws lifted with a hoist and reversed, to reverse the skidding direction.

Because many different embodiments may be within the scope of the invention taught, because modifications may be made in the embodiments taught herein, it is to be understood that the details herein are to be interpreted as illustrative and not in a limited sense.

What is claimed is:

1. An apparatus for skidding a heavy skid base and drilling substructure along the surface of an offshore drilling platform to position drilling equipment over a particular well, said apparatus comprising:
   (a) at least two cover plates appropriately attached to the top flanges of a like number of I-beams, each of said cover plates having a plurality of holes formed therethrough;
   (b) a claw adapted to mount over each of said cover plates, each of said claws including a guide plate for engaging said I-beams, said guide plates being adjustably mounted with said claws, whereby said claws are adaptable to various widths of I-beams, and including a pin mounted to each of said claws for engaging said holes in said cover plates to prevent movement of said claws with respect to said cover plates, said pins being of cylindrical configuration and being slideably mounted with said claws for movement into and out of engagement with said holes formed through said cover plates, said pins further having bevelled surfaces thereon, and being disposed in relation to said cover plates wherein said bevelled surfaces abutt the tops of said holes through said cover plates whereby urging said pins longitudinally of said cover plates will raise said pins, the direction of skidding of said skid base being reversed by raising said pins, rotating said pins 180° such that the bevelled surfaces are reversed, lowering said pins, and retracting said skid base, said apparatus further including means for urging said pins downwardly into engagement with said holes formed through said cover plates; and
   (c) means attached between said skid base and said drilling substructure and each of said claws for moving, in an extensible and/or retractible manner, said skid base and drilling substructure with respect to said claws.

* * * * *